United States Patent
No et al.

(10) Patent No.: US 7,929,414 B2
(45) Date of Patent: Apr. 19, 2011

(54) MODIFIED SLM SCHEME WITH LOW COMPLEXITY FOR PAPR REDUCTION OF OFDM SYSTEMS

(75) Inventors: Jong-Seon No, Seoul (KR); Dong Joon Shin, Seoul (KR); Seok-Joong Heo, Seoul (KR); Hyung Suk Noh, Seoul (KR)

(73) Assignee: SNU R & DB Foundation, Seoul (KR)

( * ) Notice: Subject to any disclaimer, the term of this patent is extended or adjusted under 35 U.S.C. 154(b) by 0 days.

(21) Appl. No.: 12/307,127

(22) PCT Filed: Sep. 3, 2007

(86) PCT No.: PCT/KR2007/004239
§ 371 (c)(1),
(2), (4) Date: Dec. 30, 2008

(87) PCT Pub. No.: WO2008/146986
PCT Pub. Date: Dec. 4, 2008

(65) Prior Publication Data
US 2010/0110875 A1    May 6, 2010

(30) Foreign Application Priority Data
May 29, 2007   (KR) .......................... 10-2007-0052284

(51) Int. Cl.
*H04J 11/00*      (2006.01)
(52) U.S. Cl. ........................................ 370/208; 370/210
(58) Field of Classification Search .................. 370/203, 370/204, 205, 206, 207, 208, 210
See application file for complete search history.

(56) References Cited

U.S. PATENT DOCUMENTS

| | | | |
|---|---|---|---|
| 2003/0067866 A1 | 4/2003 | Jung | |
| 2004/0160893 A1* | 8/2004 | Park et al. | 370/206 |
| 2006/0245346 A1* | 11/2006 | Bar-Ness et al. | 370/203 |
| 2007/0217329 A1* | 9/2007 | Abedi | 370/208 |
| 2008/0285432 A1* | 11/2008 | Ueng et al. | 370/203 |

FOREIGN PATENT DOCUMENTS

| | | |
|---|---|---|
| KR | 20040056791 A | 7/2004 |
| WO | WO2005025102 A1 | 3/2005 |

OTHER PUBLICATIONS

A Low-Complexity Selected Mapping Scheme for peak-to-average Power Ratio Reduction in OFDM Systems. by Wang et al. 2004.*
International Search Report of the Patent Cooperation Treaty in counterpart foreign Application No. PCT/KR2007/004239 filed Sep. 3, 2007.

* cited by examiner

*Primary Examiner* — Huy D Vu
*Assistant Examiner* — Dady Chery
(74) *Attorney, Agent, or Firm* — Kinney & Lange, P.A.

(57) ABSTRACT

Provided are an apparatus and method for reducing a PAPR with less computation complexity without distortion using a selected mapping scheme (SLM) in an OFDM system. The method includes: generating a plurality of OFDM signal sequences by performing an inverse fast Fourier transform (IFFT) operation on input symbol sequences, which are probabilistically independent and have identical information; linearly combining the plurality of OFDM signal sequences by using complex numbers; and generating different OFDM signal sequences based on the linear combination. Accordingly, the number of phase sequences can be increased without almost increasing a computation amount of SLM.

9 Claims, 5 Drawing Sheets

[Figure 1]
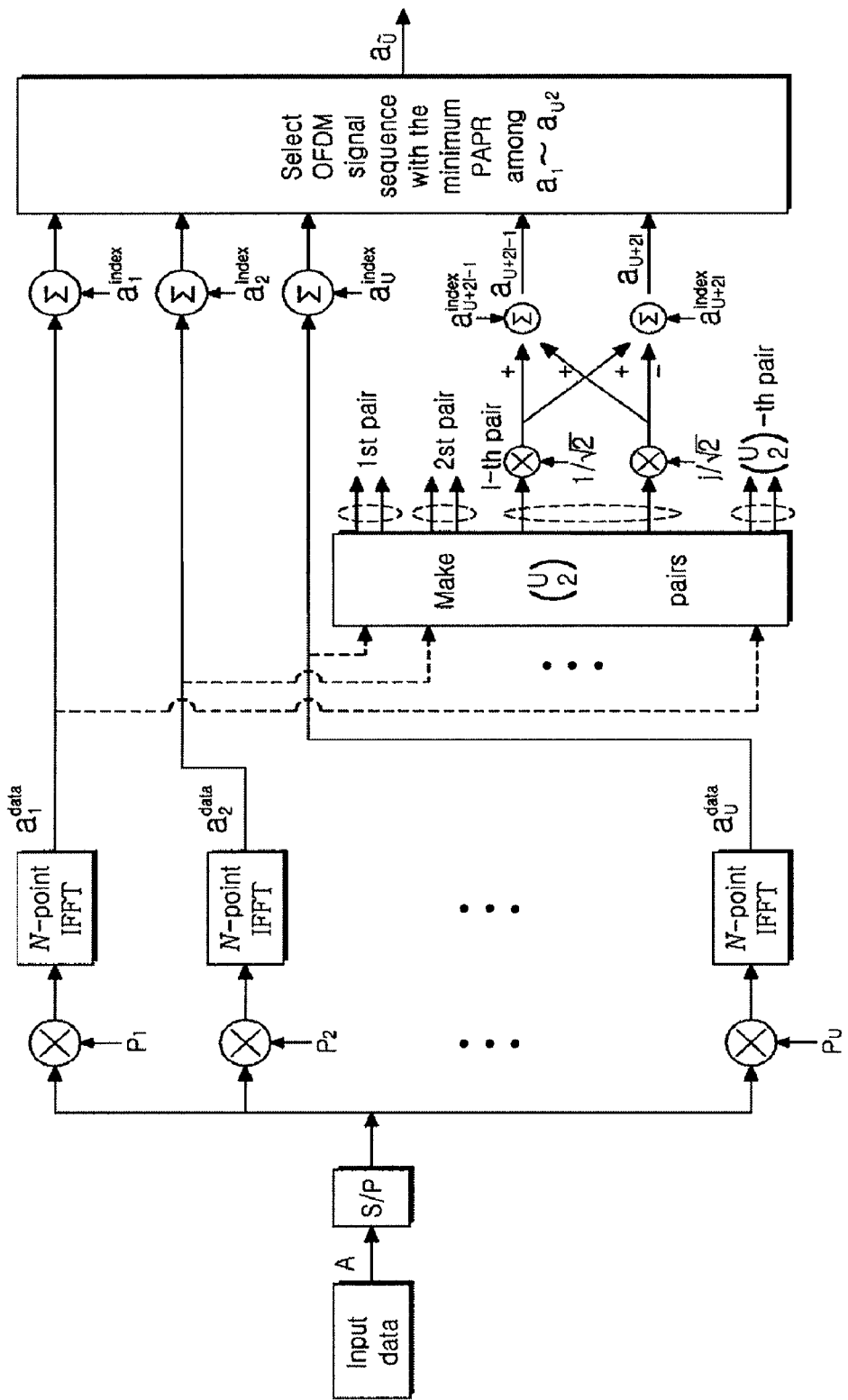

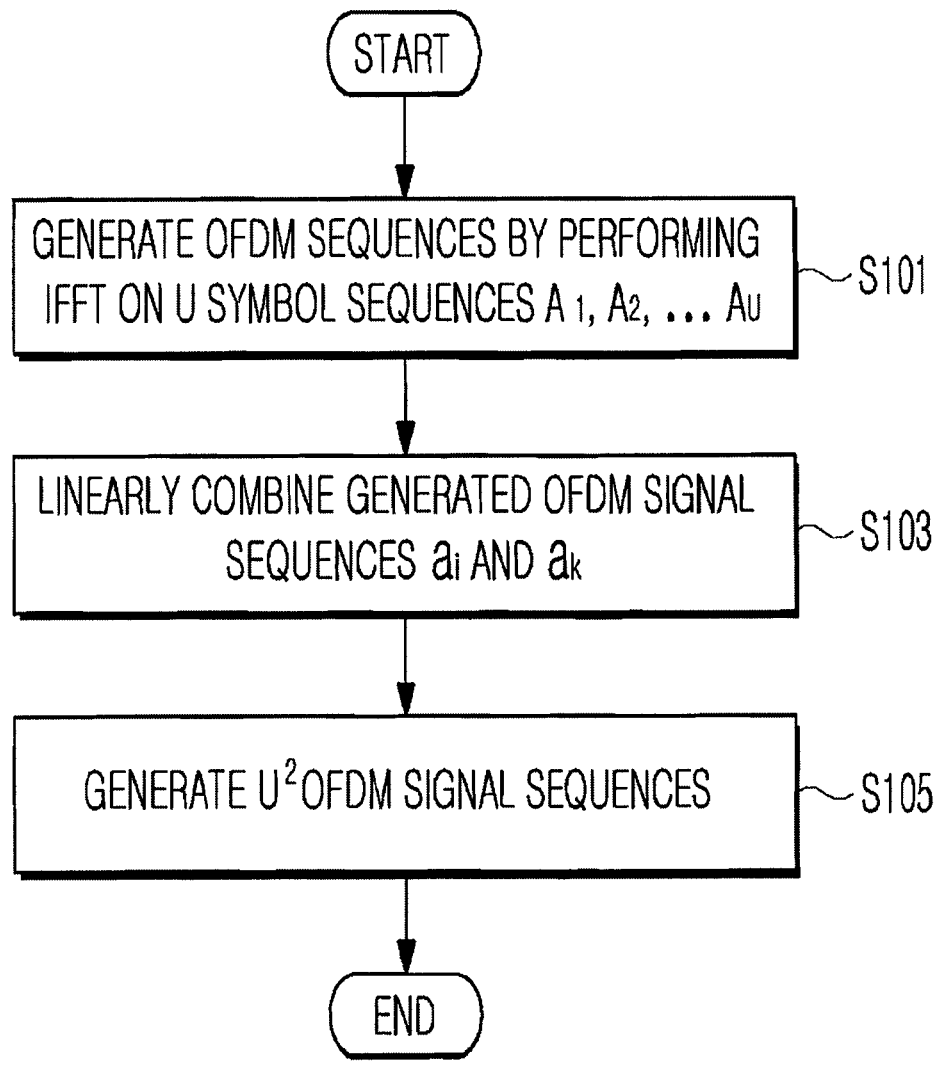

[Figure 3]

|  | Conventional SLM $U=9$ | Modified SLM $U=3$ | CCRR | Conventional SLM $U=16$ | Modified SLM $U=4$ | CCRR |
|---|---|---|---|---|---|---|
| # IFFTs | 9 | 3 ($U^2=9$) |  | 16 | 4 ($U^2=16$) |  |
|  | $N=256$ | | | | | |
| # Complex multiplications | 11,520 | 5,376 | 53.3% | 20,480 | 8192 | 60.0% |
| # Complex additions | 18,432 | 6,400 | 65.3% | 32,768 | 11,264 | 65.6% |
|  | $N=512$ | | | | | |
| # Complex multiplications | 25,344 | 11,520 | 54.5% | 45,056 | 17,408 | 61.4% |
| # Complex additions | 41,472 | 16,896 | 59.3% | 73,728 | 24,576 | 66.7% |
|  | $N=1024$ | | | | | |
| # Complex multiplications | 55,296 | 24,576 | 55.6% | 98,304 | 36,864 | 62.5% |
| # Complex additions | 92,160 | 36,864 | 60.0% | 163,840 | 53,248 | 67.5% |
|  | $N=2048$ | | | | | |
| # Complex multiplications | 119,808 | 52,224 | 56.4% | 212,992 | 77,824 | 63.5% |
| # Complex additions | 202,752 | 77,872 | 61.6% | 360,448 | 81,920 | 77.3% |

[Figure 4]
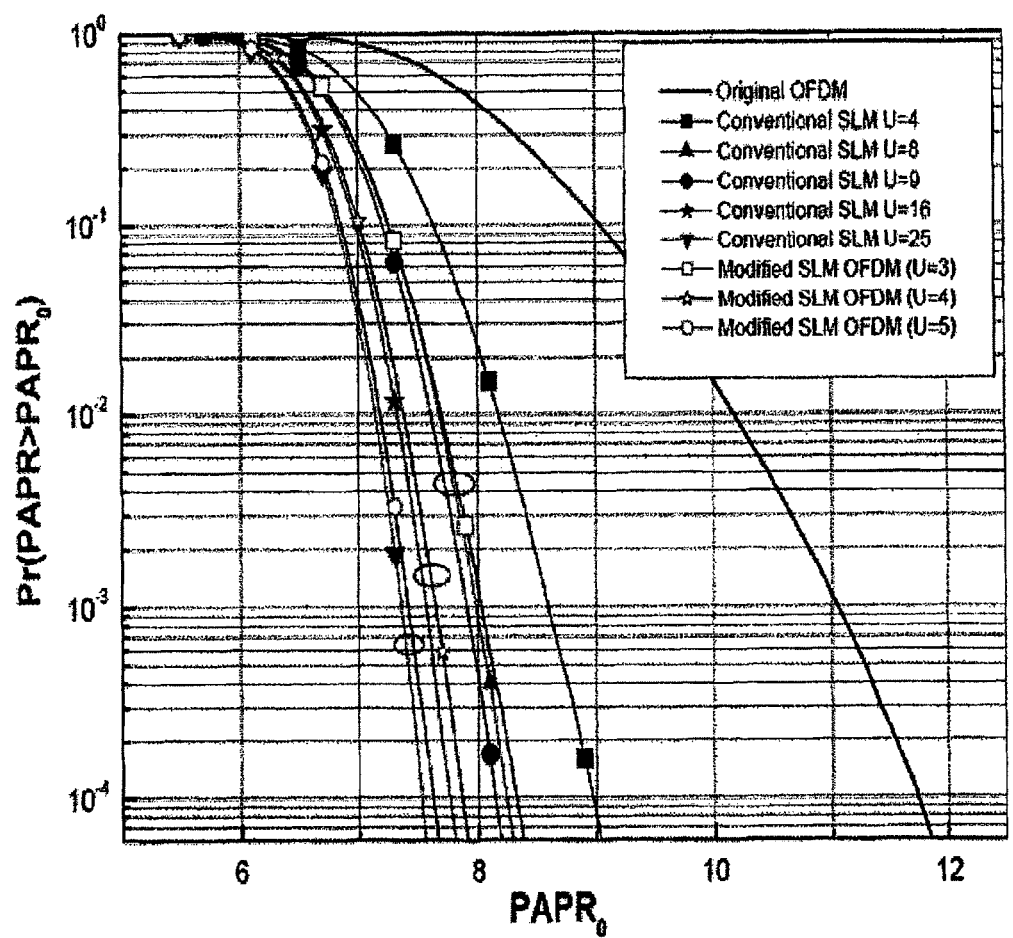

[Figure 5]
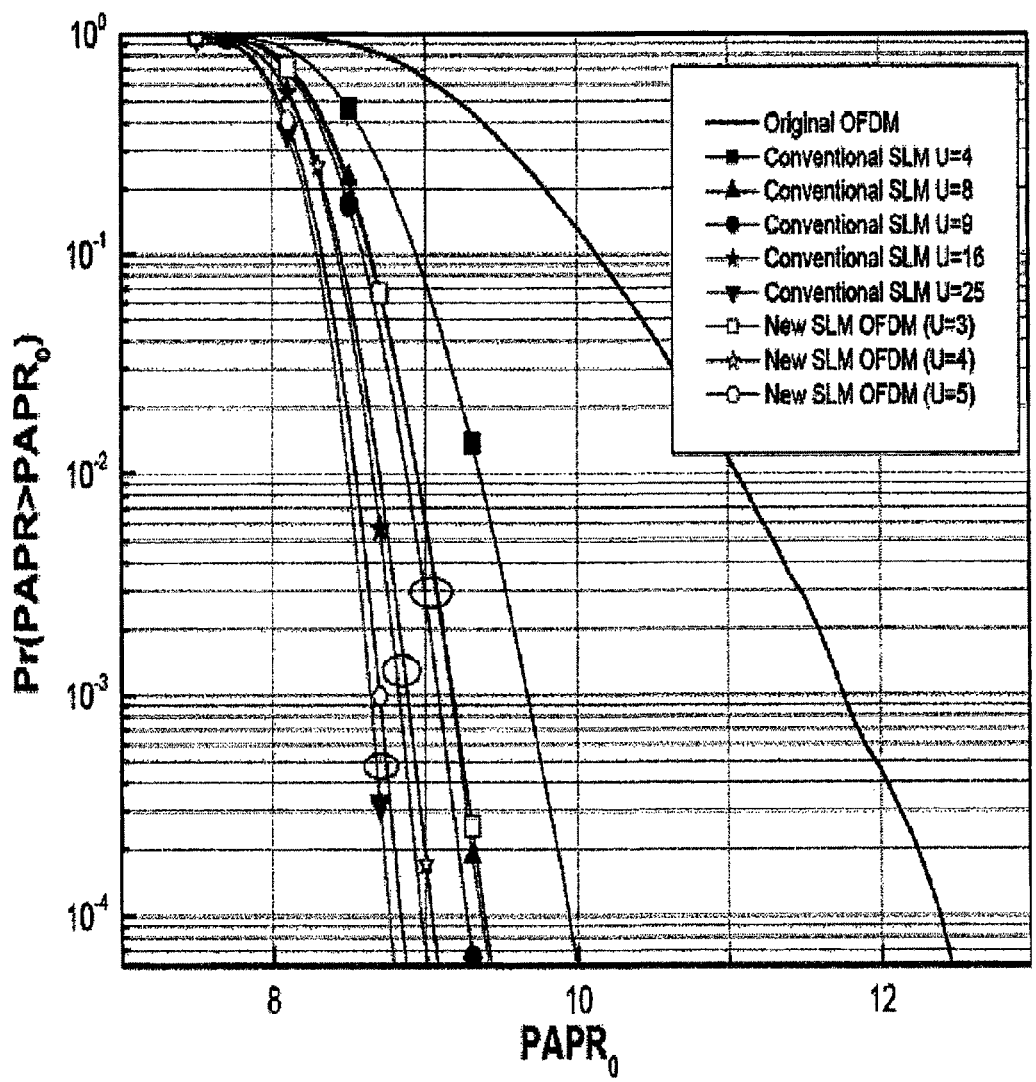

MODIFIED SLM SCHEME WITH LOW COMPLEXITY FOR PAPR REDUCTION OF OFDM SYSTEMS

TECHNICAL FIELD

The present invention relates to a method for reducing a peak-to-average power ratio (PAPR) of an orthogonal frequency division multiplexing (OFDM) system and, more particularly, to an apparatus and method for reducing a PAPR with less computation complexity without distortion using a selected mapping scheme (SLM) in an OFDM system.

BACKGROUND ART

Lately, an orthogonal frequency division multiplexing (OFDM) scheme becomes the major technology in a wireless communication system. The OFDM scheme is a digital modulation method for transmitting data at a high speed by dividing data and loading the divided data on a plurality of subcarriers having orthogonal relation with each others. Since the OFDM scheme allows multiplexing of further more subcarriers than a frequency division multiplexing (FDM) scheme, the OFDM scheme has high frequency efficiency and is durable for inter symbol interference (ISI) because of multipath. Therefore, the OFDM scheme is suitable for high speed data transmission. Particularly, the OFDM scheme has been selected for various wireless communication systems such as a wide range local area network (WLAN), a wireless metropolitan area network (WMAN), power line communication (PLC), digital audio broadcasting (DAB), and digital video broadcasting (DVB).

Since the OFDM scheme can obtain a high data transmission rate at a wireless communication system and has high durability even at a frequency selective fading channel, the OFDM scheme has been receiving attention for wireless communication system.

However, an OFDM signal has a significant large peak-to-average power ratio (PAPR) at a transmitter. It causes in-band distortion and out-band distortion at a high power amplifier (HPA) and deteriorates a bit error rate, finally. Therefore, it is major concern of related studies to reduce the signal distortion in the HPA by reducing the PARP of the OFDM signal.

There have been many studies made for reducing the PAPR of the OFDM signal, and various PAPR reduction methods have been introduced. Such PAPR reduction methods may be classified by two references.

At first, the PAPR reduction methods may be classified into an additive method and a multiplicative method by whether it is performed through addition or multiplication. For example, a selected mapping (SLM) method and a partial transmit sequence (PTS) method are the multiplicative method because an input symbol sequence is multiplied with a phase sequence in the SLM method and the PTS method. On the contrary, a tone reservation (TR) method or a clipping method is the additive method because a reference signal is added in the TR method and the clipping method.

Also, the PAPR reduction method may be divided into a decisive method and a probabilistic method. The decisive method is a method for limiting the PAPR of the OFDM signal below a predetermined threshold like the clipping scheme. However, the probabilistic method improves PAPR distribution characteristic of the OFDM signal, probabilistically. The probabilistic methods such as the SLM method and the PTS method generate a plurality of signals having the same information, select one having the smallest PAPR from the plurality of signals, and transmit the selected signal.

Although it is known that the SLM method has better performance than the PTS method when the same amount supplementary information is used, the SLM method requires a more computation amount than the PTS because it is required to increase the number of phase sequences to improve the PAPR reduction performance and the computation amount of the SLM method increase linearly as the number of phase sequences increases.

DISCLOSURE

Technical Problem

An embodiment of the present invention is directed to providing a method for reducing a peak-to-average power ratio (PAPR) using a selected mapping (SLM) method in an orthogonal frequency division multiplexing (OFDM) system in order to increase the number of phase sequences without the computation amount of the SLM method increased.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a method for reducing a peak-to-average power ratio (PAPR) of an orthogonal frequency division multiplexing (OFDM) system using a selected mapping (SLM) scheme, the method including: generating a plurality of OFDM signal sequences by performing an inverse fast Fourier transform (IFFT) operation on U input symbol sequences $A_1, A_2, \ldots, A_U$, which are probabilistically independent and have identical information; linearly combining the plurality of OFDM signal sequences $a_i$ and $a_k$ by using complex numbers $c_i$ and $c_k$; and generating $U^2$ OFDM signal sequences based on the linearly combining of the plurality of OFDM sequences $a_i$ and $a_k$.

The plurality of OFDM signal sequences $a_i$ and $a_k$ may be combined with 90° of a phase delay.

The plurality of OFDM signal sequences may be expressed as:

$$\alpha_u = \mathrm{IFFT}(A_u) = \mathrm{IFFT}(A \otimes P_u)$$

wherein $\otimes$ denotes multiplication of elements located at identical positions of each vector, and a phase sequence $P_u$ is a vector having complex numbers $P_{u,n} = e^{j\phi_{u,n}}$ ($0 \leq n \leq N-1$) having a unit size when $\phi_{u,n}$ has a value between 0 and $2\pi$ ($\phi_{u,n} \in [0, 2\pi)$) and when u is larger than 1 and smaller than U ($1 \leq u \leq U$).

The linear combining of the plurality of OFDM signal sequences $a_i$ and $a_k$ by using $c_i$ and $c_k$ may be expressed as:

$$\begin{aligned}
a_{i,k} &= c_i a_i + c_k a_k \\
&= c_i \mathrm{IFFT}(A \otimes P_i) + c_k \mathrm{IFFT}(A \otimes P_k) \\
&= \mathrm{IFFT}(A \otimes (c_i P_i + c_k P_k)).
\end{aligned}$$

When values corresponding to each subcarrier in $c_i P_i + c_k P_k$ have a unit size, $c_i P_i + c_k P_k$ becomes a phase sequence for a new OFDM signal sequence $a_{i,k}$.

Each element of the $c_i P_i + c_k P_k$ has a unit size when each element of phase sequences $P_i$ and $P_k$ has a value of $\{\pm 1\}$.

Each element of the $c_i P_i + c_k P_k$ may have a unit size when ci and ck are satisfied by $$C_i = \pm \frac{1}{\sqrt{2}} \text{ or}$$

$$C_k = \pm \frac{1}{\sqrt{2}}.$$

If $\binom{U}{2}$ denotes $U(U-1)/2$, $2\binom{U}{2}$ of additional phase sequences are generated from U binary phase sequences as:

$$\left\{ \begin{array}{c} P_1, P_2, \ldots, P_U, \frac{1}{\sqrt{2}}(P_1 \pm jP_2), \\ \frac{1}{\sqrt{2}}(P_1 \pm jP_3), \ldots, \frac{1}{\sqrt{2}}(P_{U-1} \pm jP_U) \end{array} \right\}$$

In accordance with another aspect of the present invention, there is provided a method for reducing a peak-to-average power ratio (PAPR) of an orthogonal frequency division multiplexing (OFDM) system using a selected mapping (SLM) scheme, the method including: generating a plurality of OFDM signal sequences by performing an inverse fast Fourier transform (IFFT) operation on U input symbol sequences $A_1, A_2, \ldots, A_U$, which are probabilistically independent and have identical information; linearly combining the plurality of OFDM signal sequences $a_i$ and $a_k$ by using complex numbers $c_i$ and $c_k$; and generating $U^2$ OFDM signal sequences based on the linearly combining of the plurality of OFDM sequences $a_i$ and $a_k$, wherein the generated OFDM signal sequence is expressed as:

$$S = \{a_u \mid 1 \leq u \leq U^2\}$$
$$= \{a_u \mid 1 \leq u \leq U\} \cup \left\{ \frac{1}{\sqrt{2}}(a_i \pm ja_k) \mid 1 \leq u \leq U \right\}$$

An OFDM signal sequence $P_{\tilde{u}}$ having a smallest PAPR is selected from the generated OFDM signal sequences and the selected OFDM signal sequence $P_{\tilde{u}}$ is transmitted.

In accordance with still another aspect of the present invention, there is provided an apparatus for reducing a peak-to-average power ratio (PAPR) of an orthogonal frequency division multiplexing (OFDM) system using a selected mapping (SLM) scheme, the apparatus including: a first signal generator for generating a plurality of OFDM signal sequence $a_i$ and $a_k$ by performing an inverse fast Fourier transform (IFFT) operation on U input symbol sequences $A_1, A_2, \ldots, A_U$, which are probabilistically independent and have identical information; a combiner for linearly combining the plurality of OFDM signal sequences $a_i$ and $a_k$ by using complex numbers $c_i$ and $c_k$; and a second signal generator for generating $U^2$ OFDM signal sequences based on the linear combination, wherein the generated OFDM signal sequence is expressed as:

$$S = \{a_u \mid 1 \leq u \leq U^2\}$$
$$= \{a_u \mid 1 \leq u \leq U\} \cup \left\{ \frac{1}{\sqrt{2}}(a_i \pm ja_k) \mid 1 \leq u \leq U \right\}.$$

The apparatus may further include a signal transmitter for selecting and transmitting an OFDM signal sequence $P_{\tilde{u}}$ having a smallest PAPR is selected from the generated OFDM signal sequences.

Advantageous Effects

An apparatus and method for reducing a PAPR of an OFDM system using a

SLM method according to the present invention can effectively improve the PAPR reduction performance without the computation amount of the SLM increased.

DESCRIPTION OF DRAWINGS

FIG. 1 is a block diagram illustrating a new selected mapping (SLM) scheme in an orthogonal frequency division multiplexing (OFDM) system, which is introduced in the present invention.

FIG. 2 is a flowchart illustrating a method for reducing a PAPR of an OFDM system using a SLM method according to an embodiment of the present invention.

FIG. 3 is a table for comparing computational complexities of a typical SLM method according to the related art and an SLM method introduced in the present invention when a size of IFFT is 256, 512, 1024, and 2048.

FIG. 4 is a graph illustrating PAPR reduction performances when a size of IFFT is 256 in order to compare the PAPR reduction performances of a typical SLM scheme and an SLM scheme of the present invention in a system using a 16-QAM modulation method.

FIG. 5 is a graph illustrating PAPR reduction performances when a size of IFFT is 2048 in order to compare the PAPR reduction performances of a typical SLM scheme and an SLM scheme of the present invention in a system using a 16-QAM modulation method.

BEST MODE

The advantages, features and aspects of a peak to average power ratio (PAPR) reduction method of an orthogonal frequency division multiplexing (OFDM) system using a selected mapping (SLM) method according to the present invention will become apparent from the following description of the embodiments with reference to the accompanying drawings, which is set forth hereinafter.

FIG. 1 is a block diagram illustrating a new selected mapping (SLM) scheme in an orthogonal frequency division multiplexing (OFDM) system, which is introduced in the present invention, and FIG. 2 is a flowchart illustrating a method for reducing a PAPR of an OFDM system using an SLM method according to an embodiment of the present invention.

At first, a selected mapping (SLM) scheme of an orthogonal frequency division multiplexing (OFDM) system will be described.

When complex data loaded on a $k^{th}$ subcarrier is defined as $A_k$ in a frequency domain of an OFDM system having $N=2^n$ subcarriers, sampled data transmitted through one symbol is expressed as $A=[A_0, A_1, \ldots, A_{N-1}]$. An OFDM signal is transmitted with N modulated subcarriers having a gap of 1/T frequency. When t denotes a continuous time, an OFDM signal can be expressed as Eq. 1 in a time domain.

$$a_t = \frac{1}{\sqrt{N}} \sum_{n=0}^{N-1} A_n e^{j2\pi \frac{n}{NT} t}, 0 \leq t < NT \quad \text{Eq. 1}$$

An OFDM signal sampled at a Nyquist rate is expressed as a vector, and a signal sequence is expressed as $a=[a_0, a_1, \ldots, a_{N-1}]$. After an IFFT operation is performed on an one symbol A, a signal a can be expressed as Eq. 2.

$$a_k = \frac{1}{\sqrt{N}} \sum_{n=0}^{N-1} A_n e^{j2\pi \frac{n}{NT} k}, k = 0, 1, \ldots, N-1 \quad \text{Eq. 2}$$

In Eq. 2, a PAPR of an OFDM signal sequence a is defined as a ratio of peak power to average power. The PAPR of the OFDM signal sequence is expressed as follows.

$$PARK(a) = \frac{\max_{0 \leq k \leq N-1} |a_k|^2}{E[|a_k|^2]} \quad \text{Eq. 3}$$

The SLM method is one of well-known methods for reducing the PAPR of an OFDM system. Unlike a clipping method, the SLM method does not cause signal distortion. Here, $A_u$ denotes U input symbol sequences that are obtained by multiplying an input symbol sequence A with U phase sequences ($P=[P_{u,0} P_{u,1} \ldots P_{u,N-1}]$ where $1 \leq u \leq U$. The input symbol sequence $A_u$ can be expressed as Eq. 4.

$$A_u = [A_{u,0} A_{u,1} \ldots A_{u,N-1}] \quad \text{Eq. 4}$$
$$= A \otimes P_u$$
$$= [A_0 P_{u,0} A_1 P_{u,1} \ldots A_{N-1} P_{u,N-1}]$$

In Eq. 4, $\otimes$ is an operator that denotes the multiplication of elements at the same location of each vector. The phase sequence $P_u$ is a vector having complex numbers $P_{u,n} = e^{j\phi_{u,n}}$, $0 \leq n \leq N-1$ each having a unit size when $\phi_{u,n}$ has a value between 0 and $2\pi$ ($\phi_{u,n} \in [0, 2\pi)$) and u is bigger than 1 and smaller than $U(1 \leq u \leq U)$. In general, two elements such as $\{\pm 1\}$ and a set of elements such as $\{\pm 1, \pm j\}$ are used as $P_{u,n}$.

Then, an OFDM signal sequence is generated by performing IFFT on U input symbol sequences $A_1, A_2, \ldots, A_u$ which are probabilistically independent and have the same information at operation S101.

$$a_u = \text{IFFT}(A_u) = \text{IFFT}(A \otimes P_u) \quad \text{Eq. 5}$$

In Eq. 5, $a_u(1 \leq u \leq U)$ having U of the same information and different expression, and an OFDM signal sequence $P_{\tilde{u}}$ having the smallest PAPR is selected therefrom. As U increases, the PARP reduction of the OFDM signal sequence decreases. Likely, the computational complexity of the SLM method increases as U increases although the SLM method is very simple.

In the present invention, a new PAPR reduction method is introduced by modifying the typical SLM method. The introduced SLM method has the similar PAPR reduction performance although the introduced SLM method has less computational complexity than the typical SLM method.

In the typical SLM method, it is impossible to add signals because data may be lost if a signal $a_u$ is added in a time domain transformed through IFFT. However, the SLM method according to the present embodiment enables a receiver to restore by adding two signals with 90° of phase delay using j. Therefore, the present invention introduces a method for providing equal or improved PAPR reduction performance with less computational complexity by enabling generating more combinations without performing an IFFT operation for all of signals generated by multiplying a phase sequence. According to the present invention, similar or improved PAPR reduction performance can be provided with less computational complexity by enabling generating more combinations without performing an IFFT operation for all of signals generated by multiplying a phase sequence.

In the SLM method, it is required to generate many OFDM signal sequences in order to reduce the PAPR. However, it may increase computational complexity because it requires an IFFT operation. Therefore, it is very important to reduce computational complexity, and the computational complexity may be reduced by reducing the number of the IFFT operations.

Hereinafter, $a_i$ and $a_k$ denote OFDM signal sequences generated by the SLM method according to the present embodiment which is defined in Eq. 5. At operation S103, the linear combination of two sequences can be expressed as Eq. 6 by the linear characteristics of Fourier Transformation when $C_i$ and $C_k$ are complex numbers.

$$a_{i,k} = c_i a_i + c_k a_k \quad \text{Eq. 6}$$
$$= c_i IFFT(A \otimes P_i) + c_k IFFT(A \otimes P_k)$$
$$= IFFT(A \otimes (c_i P_i + c_k P_k))$$

In Eq. 6, if values of each subcarrier in $c_i P_i + c_k P_k$ have a unit size, $c_i P_i + c_k P_k$ may be a phase sequence for a new OFDM signal sequence $a_{i,k}$. Therefore, a new OFDM signal sequence $a_{i,k}$ can be generated without performing additional IFFT operations. When values of each subcarrier of phase sequences $P_i$ and $P_k$ has a unit size, it very important each element of $c_i P_i + c_k P_k$ has a unit size too. Each of elements in $c_i P_i + c_k P_k$ has the unit size when below conditions are satisfied.

i) each element of phase sequences $P_i$ and $P_k$ has a value of $\{\pm 1\}$.

ii) $c_i$ and $c_k$ that satisfy $c_i = \pm 1/\sqrt{2}$, $c_k = \pm 1/\sqrt{2}$ are selected.

Since two different OFDM signal sequences that are generated using phase sequences $\pm(c_i P_i + c_k P_k)$ have the same PAPR, $c_i = \pm 1/\sqrt{2}$ and $c_k \pm 1/\sqrt{2}$ are only considered. When $|c_i|^2 = |c_k|^2 = 1/2$, the average power of $a_{i,k}$ becomes the half of the average power of $a_i$ and $a_k$.

When denotes $\binom{U}{2}$ denotes $U(U-1)/2$, it is possible to obtain $2\binom{U}{2}$ additional phase sequences from U binary phase sequences as shown in Eq. 7.

$$P_1, P_2, \ldots, P_u, \frac{1}{\sqrt{2}}(P_1 \pm jP_2), \quad \text{Eq. 7}$$
$$\frac{1}{\sqrt{2}}(P_1 \pm jP_3), \ldots, \frac{1}{\sqrt{2}}(P_{U-1} \pm jP_U)$$

The PAPR reduction method according to the present embodiment can be described as follows. At operation S105, $U^2$ different OFDM signal sequences are generated through the combination of U OFDM signal sequences $a_u$ in a time domain with an IFFT operation performed.

$$S = \{a_u \mid 1 \le u \le U^2\} \quad \text{Eq. 8}$$
$$= \{a_u \mid 1 \le u \le U\} \cup \left\{ \frac{1}{\sqrt{2}}(a_i \pm ja_k) \,\bigg|\, 1 \le u \le U \right\}$$

Eq. 8 only requires U times of IFFT operations and $U^2$-U times of additions of OFDM signals. However, the complexity of addition of the OFDM signals can be ignored because it is very small compared to the complexity of the IFFT operation. The computational complexity reduction of the PAPR reduction method according to the present embodiment will be described in later.

Then, an OFDM signal sequence $P_{\tilde{u}}$ having the smallest PAPR is selected from the different OFDM signal sequences in a set S and is transmitted with an index ũ. When a M-QAM modulation scheme is performed, $\lceil \log_M U^2 \rceil$ bits are allocated as side information to transmit the index ũ.

The method for reducing a PAPR of an OFDM system using an SLM scheme according to the present embodiment reduces the complexity by generating $U^2$-U OFDM signal sequences using previously generated U OFDM signal sequences. On the contrary, an introduced method for reducing a PAPR using U binary phase sequences provides a PAPR reduction performance similar to a typical SLM method using $U^2$ binary phase sequence.

It is required to perform complex number multiplication and complex number addition to perform an IFFT operation, and it is also required to perform additional complex number addition for combining a plurality of OFDM signal sequences. In the present embodiment, computational complexity is considered in views of complex number multiplication, complex number addition, and binary number multiplication.

If the number of subcarriers is $N=2^n$ and if an IFFT operation is performed U times after multiplying a phase sequence, it is required to perform $2^{n-1}nU$ times of complex number multiplication and $2^n nU$ times of complex number addition in a typical SLM according to the related art. It is also required to perform additional $2^n U^2$ complex number multiplication to find peak current of each of a plurality of OFDM signal sequences. Therefore, the total number of performing the complex multiplication is $2^{n-1}nU+2^n U^2$. However, the method for reducing a PAPR of an OFDM system according to the present embodiment requires $2^n \cdot 2\binom{U}{2}$ times of complex number addition to additionally combine a plurality of OFDM signal sequences for $(c_i, c_k)$. Here, although it is required to perform $2^n(U-1)$ times of most significant bit (MSB) inversion to generate U input symbol sequence $A_u$, it can be ignored because the computing amount is small.

When the method for reducing a PAPR according to the present embodiment is compared with a typical SLM scheme according to the related art, a computational complexity reduction ration (CCRR) can be defined as following Eq. 9.

$$CCRR = \left(1 - \frac{\text{computational complexity of present invention}}{\text{computational complexity of SLM according to related art}}\right) \times 100(\%) \quad \text{Eq. 9}$$

When U and n are given, the CCRR of the computational complexity of the present invention and the computational complexity of an SLM according to related art is calculated as shown in FIG. 3. FIG. 3 clearly shows that the PAPR reduction method according to the present embodiment is more effective than the related art in a view of computational complexity as a FFT size and U increase.

Since the number of combined OFDM signals is the same in the SLM method according to the present embodiment and the SLM method according to the related art when the SLM method according to the present embodiment is compared with the SLM method according to the related art, the number of required complex number multiplication is identical. For example, in the typical SLM method according to related art with U=16 and the SLM method according to the present embodiment with U=4, sixteen OFDM signals are generated in a frequency domain. Therefore, the typical SLM method according to the related art and the SLM method according to the present embodiment require the same number of complex number multiplication for performing IFFT operations and complex number multiplication for finding peak current of each OFDM signal. However, the SLM method according to the present embodiment additionally needs complex number additions for generating new OFDM signals by adding IFFT-transformed signals.

A SLM method introduced in an OFDM and OFDMA downlink system in IEEE 802.16 was mathematically analyzed. The OFDM and OFDMA defined in IEEE 802.16 use 256 and 2048 subcarriers to transmit data generated using 16-QAM and 64-QAM modulation methods.

In case of the OFDM system using 256 subcarriers, 200 subcarriers are used to transmit data and 56 subcarriers are not used to transmit data. In case of the OFDMA system using 2048 subcarriers, 1702 subcarriers are used to transmit data, and 346 subcarriers are not used to transmit data because 346 subcarriers are boundary subcarriers. Here, 256 and 2048 subcarriers are used for an input symbol sequence A, and boundary subcarriers are ignored.

A complementary cumulative distribution function (CCDF) of a PAPR of a typical SLM method with U=4, 8, 9, 16, 25, and a PAPR of an SLM method according to the present embodiment with U=3, 4, 5 is expressed through simulation. A phase sequence used in a SLM is used using a row of a cyclic Hadamard matrix. FIGS. 4 and 5 show simulation result of generating $10^6$ input symbol sequences. FIGS. 4 and 5 show a CCDF when a PAPR of an OFDM signal sequence is higher than a predetermined PAPR when 256 or 2048 subcarriers are used.

FIG. 4 clearly shows that the SLM according to the present embodiment having U=3 provides the almost same performance of the typical SLM having U=8 when 256 subcarriers are used. Also, FIG. 4 shows that the SLM according to the present invention having U=4 has 0.1 dB of performance difference compared to the SLM according to the related art having U=16 in an OFDM system using 256 subcarriers. In case of the PAPR reduction method according to the present embodiment having U=4, the computational complexity thereof is reduced about 63.5%, and the PAPR thereof is reduced as much as 3.5 dB in $\Pr(PAPR>PAPR_0)=10^{-4}$ compared to a general OFDM signal without a PAPR reduction method applied. The PAPR reduction method according to the present embodiment enables using an amplifier having a short linear period by reducing the peak current as much as 3.5 dB when the CCDF is $10^{-4}$. Therefore, a manufacturing cost of a base station may be reduced and it is possible to improve bit error rate compared to the typical PAPR reduction method. Since the system complexity and the computational complexity significantly increase in case of the typical SLM using U=16, it is very difficult to realize the typical SLM. However, it is possible to obtain the similar PAPR performance graph using only $\sqrt{U}$ in the PAPR reduction method according to the present embodiment. Therefore, it is very easy to realize the PAPR reduction method according to the present embodiment.

While the present invention has been described with respect to certain preferred embodiments, it will be apparent to those skilled in the art that various changes and modifications may be made without departing from the scope of the invention as defined in the following claims.

INDUSTRIAL APPLICABILITY

The present invention relates to a modified SLM method for reducing a PAPR of an OFDM system. The modified SLM method can reduce computational complexity and provide the similar reduction performance compared to a typical SLM method according to the related art.

Also, the PAPR reduction apparatus and method of an OFDM system according to the present invention can be more effectively applied to a high speed transmission OFDM system because computational complexity reduction increases as the number of subcarriers and U increase.

The invention claimed is:

1. An apparatus for reducing a peak-to-average power ratio (PAPR) of an orthogonal frequency division multiplexing (OFDM) system using a selected mapping (SLM) scheme, the apparatus comprising:
a first generator for generating a plurality of OFDM signal sequences by performing an inverse fast Fourier transform (IFFT) operation on U input symbol sequences $A_1$, $A_2$, ..., $A_u$, which are probabilistically independent and have identical information;
a combiner for linearly combining the plurality of OFDM signal sequences $a_i$ and $a_k$, which are generated by the first generator, by using complex numbers $c_i$ and $c_k$; and
a second generator for generating $U^2$ OFDM signal sequences through linear combination of the U OFDM signal sequences $a_u$ in a time domain transformed through IFFT by the linear combination of the combiner;
wherein the first generator includes:
a sampling unit for outputting an input symbol sequence $A=[A_0\ A_1\ \ldots\ A_{n-1}]$ by sampling input data;
a multiplying unit for outputting U input symbol sequences $A_1, A_2, \ldots, A_u$ by multiplying the input symbol sequence A and U phase sequences $P=[P_{u,0}\ P_{u,1}\ \ldots\ P_{u,N-1}]$ by a carrier located at the same position, where $1 \leq u \leq U$; and
an IFFT unit for generating an OFDM signal sequence by performing an IFFT operation for each of the U input symbol sequences $A_1, A_2, \ldots, A_u$,
wherein the OFDM signal sequence is generated according to an equation:
$a_u = IFFT(A_u) = IFFT(A \otimes P_u)$,
wherein $\otimes$ denotes multiplication of elements located at identical positions of each vector, and a phase sequence $P_u$ is a vector having complex numbers $P_{u,n} = e^{j\phi_{u,n}}$ ($0 \leq n \leq N-1$) having a unit size when $\phi_{u,n}$ has a value between 0 and $2\pi$ ($\phi_{u,n} \in [0, 2\pi)$) and when u is larger than 1 and smaller than U ($1 \leq u \leq U$).

2. The apparatus of claim 1, wherein the combiner performs the linear combination with 90° of a phase delay.

3. The apparatus of claim 1, wherein the combiner combines $a_1$ and $a_k$ using $c_i$ and $c_k$ according to an equation:

$$a_{i,k} = c_i a_i + c_k a_k$$
$$= c_i IFFT(A \otimes P_i) + c_k IFFT(A \otimes P_k)$$
$$= IFFT(A \otimes (c_i P_i + c_k P_k)).$$

4. The apparatus of claim 3, wherein when values corresponding to each subcarrier in $c_i P_i + c_k P_k$ have a unit size, $c_i P_i + c_k P_k$ becomes a phase sequence for a new OFDM signal sequence $a_{i,k}$.

5. The apparatus of claim 4, wherein each element of the $c_i P_i + c_k P_k$ has a unit size when each element of phase sequences $P_i$ and $P_k$ has a value of $\{\pm 1\}$.

6. The apparatus of claim 4, wherein each element of $c_i P_i + c_k P_k$ has a unit size when $c_i$ and $c_k$ are satisfied by $c_i = \pm 1/\sqrt{2}$ or $c_k = \pm 1/\sqrt{2}$.

7. The apparatus of claim 6, wherein when $(2^U)$ denotes $U(U-1)/2$, the second generator generates $2(_2^U)$ of additional phase sequences from U binary phase sequences as:

$$\left\{ P_1, P_2, \ldots, P_u, \frac{1}{\sqrt{2}}(P_1 \pm jP_2), \frac{1}{\sqrt{2}}(P_1 \pm jP_3), \ldots, \frac{1}{\sqrt{2}}(P_{U-1} \pm jP_U) \right\}.$$

8. An apparatus for reducing a peak-to-average power ratio (PAPR) of an orthogonal frequency division multiplexing (OFDM) system using a selected mapping (SLM) scheme, the apparatus comprising:
a first signal generator for generating a plurality of OFDM signal sequence $a_i$ and $a_k$ by performing an inverse fast Fourier transform (IFFT) operation on U input symbol sequences $A_1, A_2, \ldots, A_u$, which are probabilistically independent and have identical information;
a combiner for linearly combining the plurality of OFDM signal sequences $a_i$ and $a_k$ by using complex numbers $c_i$ and $c_k$; and
a second signal generator for generating $U^2$ OFDM signal sequences based on the linear combination,
wherein the generated OFDM signal sequence is expressed as:

$$S = \{a_u \mid 1 \leq u \leq U^2\}$$
$$= \{a_u \mid 1 \leq u \leq U\} \cup \left\{ \frac{1}{\sqrt{2}}(a_i \pm ja_k) \mid 1 \leq u \leq U \right\};$$

and
wherein the first signal generator includes:
a sampling unit for outputting an input symbol sequence $A=[A_0\ A_1\ \ldots\ A_{N-1}]$ by sampling input data;
a multiplying unit for outputting U input symbol sequences $A_1, A_2, \ldots, A_u$ by multiplying the input symbol sequence A and U phase sequences $P=[P_{u,0}\ P_{u,1}\ \ldots\ P_{u,N-1}]$ a carrier located at the same position, where $1 \leq u \leq U$; and
an IFFT unit for generating an OFDM signal sequence by performing an IFFT operation for each of the U input symbol sequences $A_1, A_2, \ldots, A_u$,
wherein the OFDM signal sequence is generated according to an equation:

$a_u = IFFT(A_u) = IFFT(A \otimes P_u)$, wherein ⊗ denotes multiplication of elements located at identical positions of each vector, and a phase sequence $P_u$ is a vector having complex numbers $P_{u,n}=e^{j\phi_{u,n}}$ ($0 \leqq n \leqq N-1$) having a unit size when $\phi_{u,n}$ has a value between 0 and $2\pi$ ($\phi_{u,n} \in [0, 2\pi)$) and when u is larger than 1 and smaller than U ($1 \leqq u \leqq U$).

9. The apparatus of claim 8, further comprising a signal transmitter for selecting and transmitting an OFDM signal sequence $P_u$ having a smallest PAPR is selected from the generated OFDM signal sequences.

* * * * *

UNITED STATES PATENT AND TRADEMARK OFFICE
CERTIFICATE OF CORRECTION

PATENT NO. : 7,929,414 B2
APPLICATION NO. : 12/307127
DATED : April 19, 2011
INVENTOR(S) : Jong-Seon No et al.

It is certified that error appears in the above-identified patent and that said Letters Patent is hereby corrected as shown below:

In the Specifications:

Col. 2, Line 53
  Insert --)-- after $2\pi$

Col. 4, Line 16-17
  Delete return between "a" and "SLM" to make one paragraph.

Col. 6, Line 54
  Delete "denotes" after "When"

In the Claims:

Col. 10, Line 19
  Delete "$2(_2^U)$"
  Insert --$2(2^U)$--

Col. 10, Line 59
  Insert --by-- before "a carrier..."

Col. 11, Line 4
  Delete "$\leqq$" (both occurrences)
  Insert --$\leq$-- and --$\leq$--

Col. 11, Line 6
  Delete "$\leqq$" (both occurrences)
  Insert --$\leq$-- and --$\leq$--

Signed and Sealed this
Twenty-eighth Day of May, 2013

Teresa Stanek Rea
*Acting Director of the United States Patent and Trademark Office*